United States Patent [19]

Watenpaugh

[11] 4,402,175

[45] Sep. 6, 1983

[54] PEPPER HARVESTING MACHINE

[75] Inventor: Norman H. Watenpaugh, Gilroy, Calif.

[73] Assignee: Patent Technology, Inc., San Francisco, Calif.

[21] Appl. No.: 241,605

[22] Filed: Mar. 9, 1981

[51] Int. Cl.³ .............................................. A01D 45/00
[52] U.S. Cl. .................................. 56/327 R; 56/119; 56/130; 56/330
[58] Field of Search .................... 56/327 R, 330, 130, 56/27.5, 119, 28, 29

[56] References Cited

U.S. PATENT DOCUMENTS

| | | | |
|---|---|---|---|
| 2,571,224 | 10/1951 | Edwards | 56/119 |
| 3,119,221 | 1/1964 | Martin | 56/119 |
| 3,720,051 | 3/1973 | Quick | 56/330 |
| 4,073,378 | 2/1978 | Jordan et al. | 56/27.5 |
| 4,083,773 | 4/1978 | Clary | 56/330 |
| 4,257,217 | 3/1981 | McClendon | 56/327 R |

Primary Examiner—Jay N. Eskovitz
Attorney, Agent, or Firm—Flehr, Hohbach, Test, Albritton & Herbert

[57] ABSTRACT

A machine for field harvesting of peppers or pepper fruit comprising a mobile frame movable over a field having spaced rows of pepper plants. A picking assembly is carried by the frame, comprising a structure formed to straddle a row of the plants. Means is carried adjacent the advancing end of the structure for upwardly straightening the plants. Dual means extends rearwardly of the straightening means for repeatedly impacting both sides of the plant as the structure advances over the same. Conveyor means receives the fruit that is removed from the plant and serves to convey the same to the rear of the structure. Additional means disposed between the plant straightening means and the advancing end of the conveyor means for picking up fruit located at or near the ground surface and for delivering the same to the conveying means.

5 Claims, 9 Drawing Figures

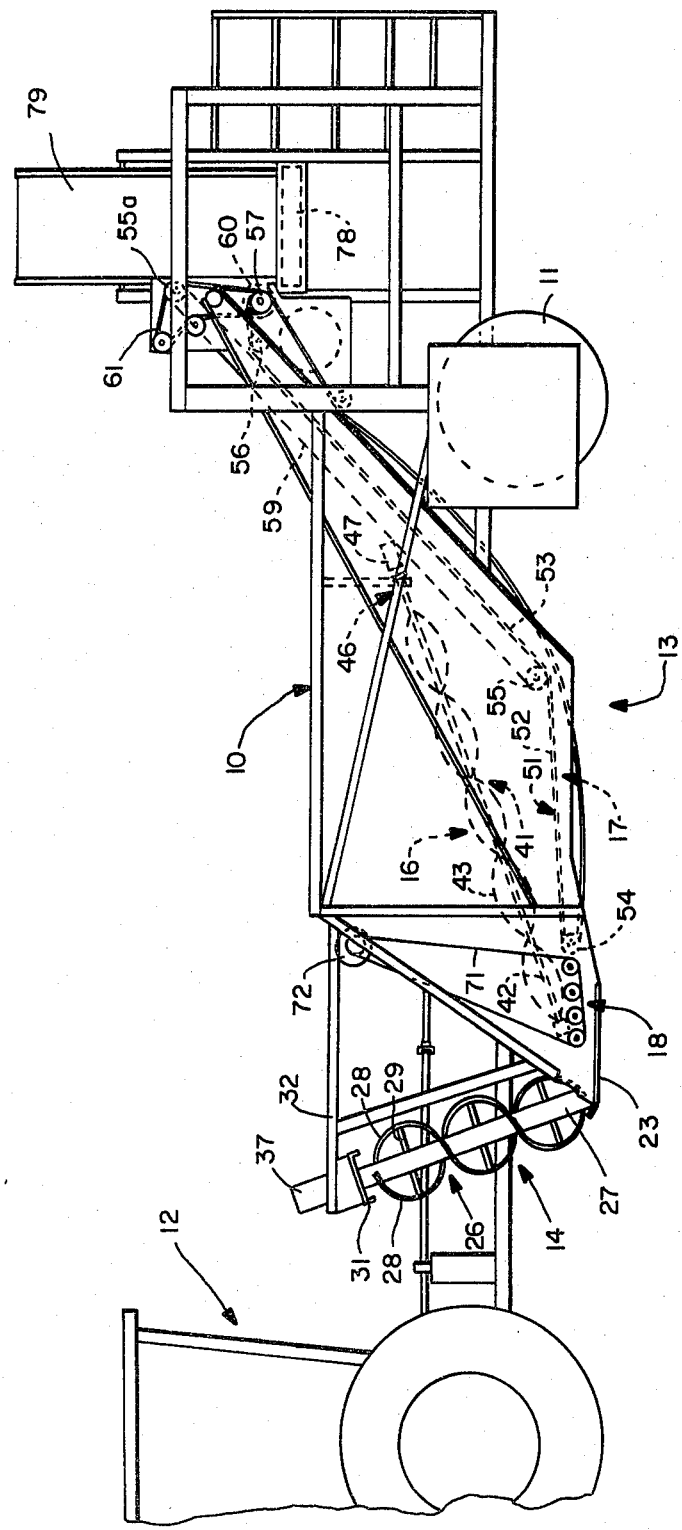
FIG.—1

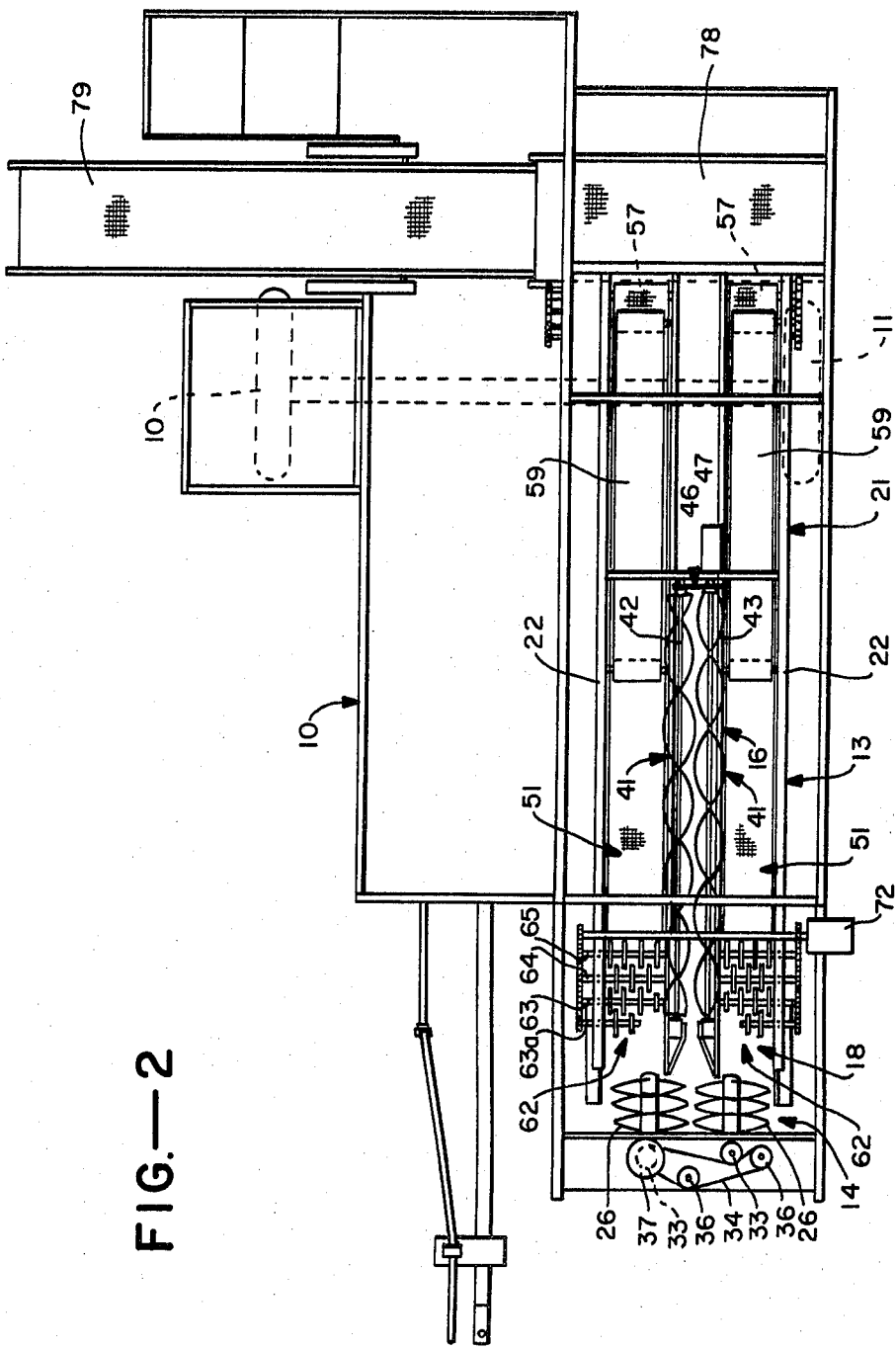
FIG.—2

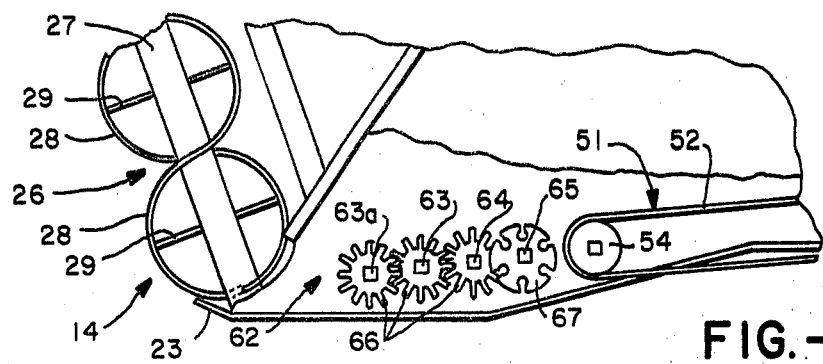
FIG.—3
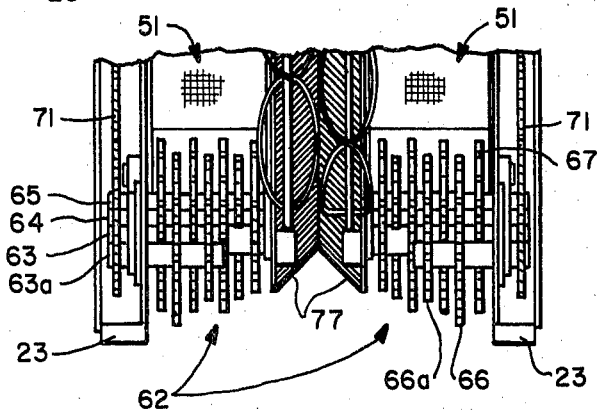
FIG.—4
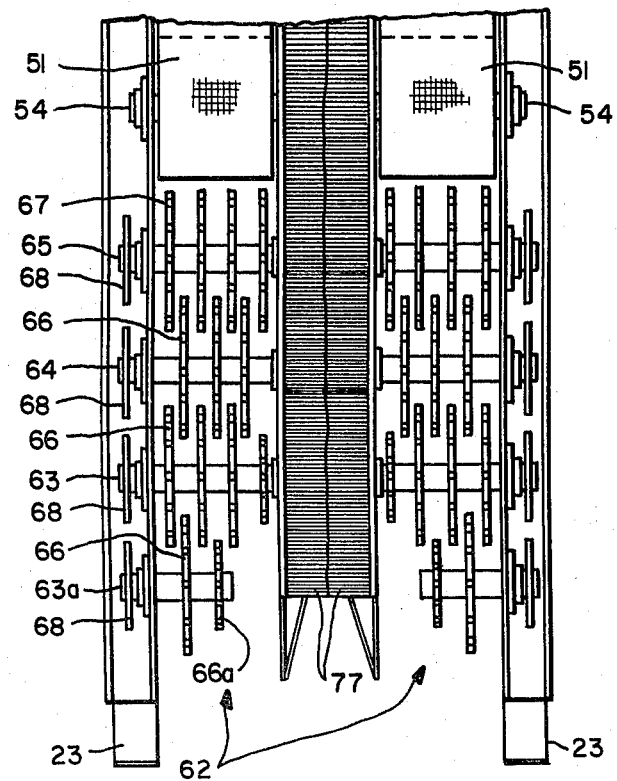
FIG.—5

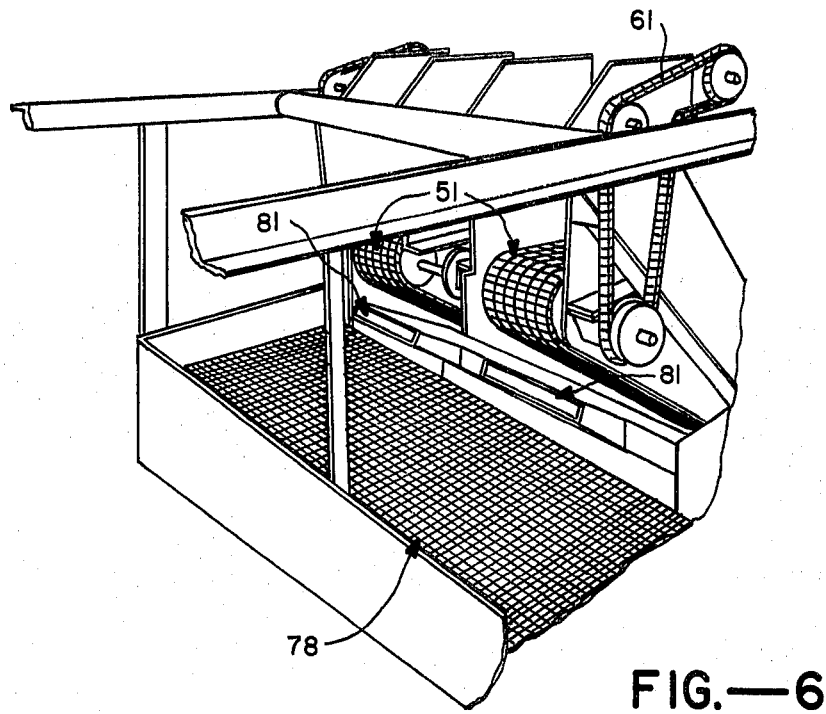
FIG.—6
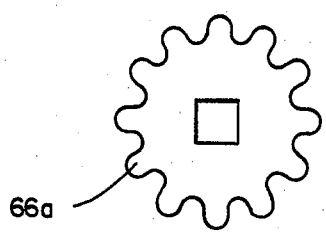
FIG.—7
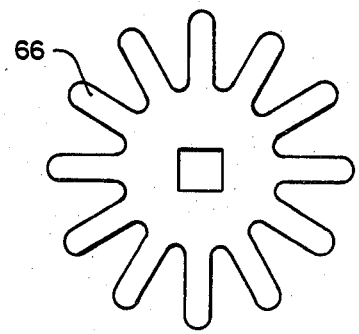
FIG.—8
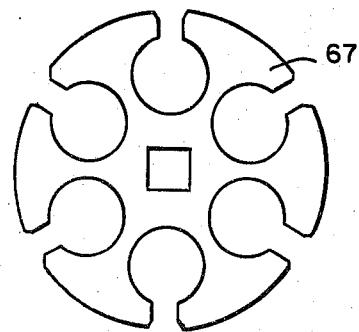
FIG.—9

PEPPER HARVESTING MACHINE

This invention relates generally to field operating machines and methods for harvesting various types of pepper fruit.

A number of machines have been proposed and constructed for the mechanical harvesting of various species of peppers. One such harvester is disclosed in a report by the U.S. Department of Agriculture and is entitled U.S.D.A. Machine Pepper Harvester Report by Dale E. Marshall, dated Jan. 26, 1979. To be commercially successful such a machine should provide a high percentage of fruit recovered (e.g. 90% or more), the machine should cause only a minimum amount of injury to the fruit, and the operating parts should be relatively reliable and simple in construction. Also in operation the machine should be free of frequent stoppages due to clogging or breakage of various parts requiring repairs. Pepper harvesters incorporating features described in that report have been unsatisfactory in certain respects. For example, they have been lacking in consistent good fruit recovery, and they have been subject to machine stoppages due to lack of reliability and excessive maintenance and repairs required.

It is an object of the present invention to provide a commercially practical machine, which will provide a high percentage of fruit recovered, having reference particularly to chili peppers, or other pepper fruit having comparable characteristics.

Another object of the invention is to provide a pepper harvesting machine which is reliable in field operations, has relatively low maintenance requirements, and is relatively simple in mechanical construction.

In general a machine incorporating the present invention consists of a mobile frame which is movable over a field having spaced rows of pepper plants. The frame carries a picking assembly that is formed to straddle a row of plants. Adjacent the advancing end of the picking assembly there is power operated means for lifting the lower branches and conditioning the plant for subsequent processing. The assembly also includes means for repeatedly impacting the fruit and the plants as the assembly passes over the same. Conveyor means is provided for receiving the fruit as it is removed from the plant, and for conveying the fruit to the rear of the assembly. The power operated means adjacent the advancing end of the assembly consists of laterally spaced plant engaging units in the form of open helixes, which are continuously rotated in opposite directions. Also the machine preferably includes means adjacent the advancing end of the assembly for picking up pepper fruit located at or near the ground surface and for delivering the same to the conveying means. In the preferred embodiment means are provided for directing air jets against the pepper fruit as it is being delivered from the conveyor means.

Additional objects and features of the invention will appear from the following description in which the preferred embodiment has been described in detail in conjunction with the accompanying drawing.

FIG. 1 is a side elevation view of a machine incorporating the present invention, portions of the side enclosing panels being removed.

FIG. 2 is a plane view of the machine shown in FIG. 1.

FIG. 3 is an enlarged detail illustrating parts incorporated in the advancing end of the picking assembly.

FIG. 4 is an enlarged plane view of the portion of the picking assembly shown in FIG. 3.

FIG. 5 is a plane view of the portion of the picking assembly shown in FIG. 3.

FIG. 6 is a detail in perspective illustrating the air-jet means associated with the discharge end of the conveyor means of the picking assembly.

FIGS. 7, 8 and 9 are details showing parts of the means near the front of the picking assembly which operates adjacent the ground surface.

Referring to FIGS. 1 and 2 the machine consists generally of a frame 10 carried by the wheels 11, and adapted to be drawn by a tractor 12. A picking unit or assembly 13 is covered by the main frame, and is adapted to straddle and operate upon a row of plants as the machine is drawn through a field.

The picking assembly includes power operated means 14 at the advancing end of the assembly, which act upon the plants to straighten the branches upwardly, thereby conditioning the plant for the following operations. Impacting means 16 to the rear of the means 14, serves to repeatedly apply laterally directed impacts to the fruit and branches of the pepper plants, thereby causing severance of the fruit from the plant. Conveyor means 17 extends adjacent to the impacting means 16, and serves to receive and convey the picked fruit toward the rear of the machine. In advance of the conveying means, and in between the means 14 and the forward end of the conveyor means, means 18 is provided for picking up pepper fruit on or adjacent to the ground surface, and delivering it to the conveyor means 17.

More specifically the picking assembly includes a subframe 21 which is secured to the main frame of the machine. The subframe provides two vertical and substantially parallel side walls 22. The forward ends of the side walls may be provided with runners or shoes 23, which are adapted to engage the ground surface on the sides of a plant row.

The means 14 in the embodiment illustrated consists of two units 26, each of which consists of a rotatable shaft 27, to which is secured the elongated members 28 that are bent to form a double helix, the axis of the helix being coincident with the axis of the shaft 27. As shown particularly in FIG. 3 the members 28 are attached to the shaft by members 29. The diameter of each double helix may, for example, be of the order of 10 inches, and the length of each unit may be of the order of 30 inches. This assumes that the majority of the pepper plants to be acted upon have a height of the order of 18 to 30 inches. Members 28 may be solid metal rods, metal pipe or tubing.

The upper ends of the shafts 27 are channeled and supported by bearings carried by the crossframe member 31. Member 31 is carried by the frame members 32, which form a part of the main frame. Preferably the mounting is such that the axes 27 are inclined forwardly in the manner shown in FIG. 1. The angle of inclination may, for example, be of the order of 20 degrees with respect to the vertical. Suitable power means is provided to rotate the shafts 27 in opposite directions. The directions of rotation are indicated by arrows in FIG. 4. The means for driving the two units may be as follows. The upper ends of the shafts 27 are provided with driving sprockets 33, which are engaged by the drive chain 34, which is also shown engaging the idler sprockets 36. A motor 37, which preferably is of the hydraulic type, is coupled to one of the sprockets 33. Assuming that motor 37 is of the hydraulic type, and that hydraulic motors are used for driving other parts of the machine, all of these motors may have fluid connection with a common hydraulic system which serves to supply hydraulic fluid to each of the motors at controlled pressures and flow rates. In practice, when the machine is moving forward at a speed of the order of 1.2 to 3 mph, each unit 14 may be driven at a speed of the order of 250 rpm.

Assuming that the machine is in operation the plants of a row are caused to pass between the two rotating units 26, and during their transit between these units, the side branches extending from the sides of the plant are engaged by the elongated members 28, with the result that branches are elevated and urged upwardly toward the center of the plant. This serves to condition the plant for effective removal of the pepper fruit. Some peppers that may be removed by the action of units 28 fall to the ground and are subsequently picked up by means 18.

The impacting means 16 consists of two rotating units 41, schematically illustrated in FIGS. 1 & 2. Each unit in this instance consists of a shaft 42 which carries the elongated members 43, which are arranged in the form of a double helix with attachments to the shaft. In a typical instance the double helix formed by members 43 may have a diameter of the order of six inches, or the pitch of the order of about 18 inches. The two double helix units are positioned substantially as illustrated in FIG. 2, in other words they are parallel with a spacing between axes substantially equal to the diameter of each helix. The two units are driven to rotate in opposite directions, without interference between the elongated members of the two units. As viewed from the front of the picking assembly, the right hand unit is rotated clockwise, and the left hand unit is driven counterclockwise. The two shafts 43 are mechanically connected to rotate in unison, as by means of the chain and sprocket assembly 46. Also one of the two shafts is shown coupled to a hydraulic type driving motor 47.

As viewed in FIG. 1 the two impacting units 41 are inclined to the horizontal, as for example at an angle of the order of 20°. As the picking assembly passes over a row of plants, the plants after being acted upon by the forward rotating units 26, are caused to pass between the rotating units 41, with the result that the branches of the plant and the pepper pods are repeatedly impacted, the impacts being first applied to the lower portions of the plant, and then to progressively higher portions. The impacts serve to detach the pepper pods from the plant, which then fall downwardly to be received by the conveyor means 17.

The conveyor means 17 consists of two conveyor units 51, which are spaced apart to permit the plants to pass between the same. Each unit consists of two portions, namely a portion 52 which is generally horizontal, and an inclined portion 53, which serves to elevate the fruit to a point of discharge. Both portions are preferably formed as a continuous endless metal belt, which engages the pulleys 54, 55, 56, 57 and 58. Retaining means is provided in conjunction with each inclined conveyor portion 53, to retain the fruit upon the conveyor belt while it is being moved upwardly to the point of discharge. The retaining means consists of a belt 59 which may be made of suitable material such as fabric reinforced synthetic rubber, with the lower end of the belt being looped about the pulley 55, and the upper end looped about pulley 55a. Both the conveyor belt 52 and belt 59 are driven whereby the lower run of belt 59 is driven at the same speed as the upper run of the conveyor portion 53. The endless belt forming each conveyor 51 is preferably foraminous and may be of the linked metal type. Thus soil or other refuse may drop through the conveyor while the fruit is being conveyed to the upper point of discharge. When fruit reaches the region of pulley 55, it is engaged between the lower run of belt 59, and the underlying conveyor portion, and thus held against backrolling and effectively conveyed to the region of sprockets 56 and 57, where it is permitted to drop down upon another conveyor as will be presently described. Both conveyors 51 and the retainer belt 59 are driven at a suitable speed by motor means, such as the hydraulic motor 60. As illustrated in FIG. 1 this motor serves to drive the sprocket chain 61 which in turn drives a sprocket on the pulley 56, and another sprocket on the pulley 55a.

Previous reference has been made to the means 18 which is disposed in front of the forward ends of the conveyors 51. This means in this instance consists of two groups 62 of pickup devices. Each group consists of horizontally disposed shafts 63, 64, 65 and 63a, which are journal to suitable portions of the subframe, and which carry the pickup wheels. Most of these wheels (66a) are formed as shown in FIG. 8 to provide radially extending fingers, the dimensioning and spacing between the fingers being such that pepper pods engaged by these wheels are elevated from the ground surface and caused to be passed to the forward end of the conveyors 51. Smaller wheels 66b may be disposed near the sides of the picking assembly. The distribution of the pick-up wheels may be substantially as shown in FIGS. 3, 4, and 5. The wheels 67 carried by the shaft 65, are preferably slotted as shown, for example, in FIG. 9, and their action is to carry pepper pods picked up by the wheels 66, and deposit them upon the forward end of the conveyor 51. Their slotted construction tends to prevent buildup of mud.

The shafts 63a, 63, 64 and 65 are all driven in the same direction, namely clockwise as the machine is viewed in FIG. 1, the suitable driving means illustrated consisting of sprockets 68 carried by the extremeties of the shafts 63, 64 and 65, the sprockets being engaged by the sprocket chain 71, which in turn is driven by the hydraulic motor 72. When the machine is in operation and moving forwardly over a row of plants, the wheels 66 and 66a operate at or near the ground surface, or their lower portions may operate through the upper surface of the ground. As previously indicated they serve to pick up fruit pods which have fallen on the ground, or which may be removed from the lower branches, and this fruit is conveyed to the conveyors 51.

Some fruit pods picked from the pepper plants during operation of the machine tend to fall downwardly through the space between the conveyors 51. To prevent the loss of any such fruit, flexible aprons 76 are provided as shown in FIGS. 4 and 5. These aprons are flexible, and they are disposed whereby their inner ends are substantially in contact along the longitudinal center line of the machine. Their outer edges are suitably secured to convenient portions of the subframe. The aprons may be made of suitable flexible material, such as brushlike bristles of suitable material such as nylon, which has sufficient flexibility to pass the plants, but at the same time provide sufficient obstruction to prevent picked fruit from falling through the same or fabric reinforced synthetic rubber. The two aprons are at an inclination as shown in FIG. 4, with their outer edges contiguous with the adjacent edges of the conveyors 51. The inclination is such (i.e. 45% horizontal) that when picked fruit is dropped upon the apron, the fruit is caused to proceed upon the adjacent conveyors 51.

Previous reference has been made to conveyor means which receives the picked fruit discharged from the conveyors 51. Thus as shown in FIG. 2 there is a horizontal cross conveyor 78 disposed to receive the discharging fruit, and this conveyor delivers the fruit to the conveyor 79. The latter elevates the conveyed fruit and may deliver it to an adjacent mobile truck or trailer.

The fruit as it is delivered from the upper ends of the conveyors 51 may be accompanied by some debris, such as soil or leaf fragments. To remove such debris the fruit as it falls from the conveyors 51 pass through pneumatic jets. Thus as shown in FIG. 6 air nozzels 81 are located immediately below the discharge ends of the conveyors 51, and by means of a connection blower (not shown), air jets are directed laterally and through the falling fruit.

As previously explained when the machine is in operation it is drawn by a tractor through a field having mature pepper plants, and with the plants in spaced parallel rows. As the picking unit approaches a plant, the plant is first acted upon by the rotating units 26, which tend to gather up the side branches of the pepper plant, whereby the plant is better conditioned for subsequent picking operations. Further movement of the machine brings the plant between the pick-up means 62, which serves to pick up fruit which may have fallen to the ground, and deliver the same to the conveyors 51. As the machine progresses to bring the plant within the zone of operation of the impacting means, the branches of the plant and the fruit are repeatedly impacted by forces applied to opposite sides of the plant and the fruit by the double helix units 41, thereby causing the pods to be separated from the plant and fall down and be received on the conveyors 51. As these peppers approach the rear end of the machine, they are carried upwardly by the conveyor portions 53 for final discharge upon the cross conveyor 78.

While falling to the conveyor 78 they are acted upon by air jets discharging from the nozzles 81.

In general the machine is highly effective in picking a variety of peppers. However it is considered particularly effective in picking peppers of the long chili types. Recoveries of the order of 90% or more can be obtained by proper use of the machine. It has been found that the manner of engaging and impacting the plants for severing the pods, does not cause any serious pod injury. The plants from which the fruit is picked are left standing in the ground, and a mimimum amount of leaves and other plant material are carried into the machine. Picking efficiencies are attributed in part to the fact that the portions of the conveyors 51 which generally underly the inclined double helix impacting means, are generally horizontal. The machine is reliable in operation, not only with respect to picking efficiency, but also with respect to maintenance and repairs.

What is claimed is:

1. A machine for field harvesting of peppers or pepper fruit comprising a mobile frame movable over a field having spaced rows of pepper plants, a picking assembly carried by the frame, the assembly comprising a structure formed to straddle a row of the plants, means carried adjacent the advancing end of the structure for upwardly straightening the plants, dual means extending rearwardly of said first named means for repeatedly impacting both sides of the plant as the structure advances over the same, conveyor means for receiving the fruit that is removed from the plant and for conveying the same to the rear of the structure, the conveyor means including two laterally spaced conveyor belts having portions extending generally below the impacting means, and additional means disposed between the first named means and the advancing end of the conveyor means for picking up fruit located at or near the ground surface and for delivering the same to said conveying means.

2. A machine as in claim 1, together with means extending between the two portions of the conveying means to cause fruit falling upon the same to be delivered to the conveying means.

3. A machine for field harvesting of peppers or pepper fruit comprising a mobile frame movable over a field having spaced rows of pepper plants, a picking assembly carried by the frame, the assembly comprising a structure formed to straddle a row of the plants, means carried adjacent the advancing end of the structure for upwardly straightening the plants, dual means extending rearwardly of said first named means for repeatedly impacting both sides of the plant as the structure advances over the same, conveyor means for receiving the fruit that is removed from the plant and for conveying the same to the rear of the structure, the conveyor means including two laterally spaced conveyor belts having portions extending generally below the impacting means, the means adjacent the advancing end of the structure consisting of a plurality of wheels, each of the wheels being formed to provide fruit engaging fingers, and means for rotatably mounting of said wheels in two latterly spaced groups, the two groups extending in advance of the forward end of the conveyor means.

4. A machine for field harvesting of peppers or pepper fruit comprising a mobile frame movable over a field having spaced rows of pepper plants, a picking assembly carried by the frame, the assembly comprising a structure formed to straddle a row of plants, for repeatedly impacting the sides of the plant as the structure advances over the same, said impacting means comprising two laterally spaced rotatable units each in the form of an open helix, and inclined upwardly from their forward ends, means for driving said units, conveyor means comprising two laterally spaced belt conveyors having generally horizontal portions underlying said units and serving to convey fruit deposited upon the same to the rear of the structure, means extending across the space between the conveyor portions for causing fruit dropping on the same to be delivered to said conveyor portions, and means disposed adjacent the advancing ends of the conveyor portions for picking up fruit located at or near the ground surface and for delivering the same to the conveyor portions, said last means comprising a plurality of wheels, each of the wheels being formed to provide fruit engaging fingers, and means for rotatably mounting said wheels in two laterally spaced groups with the two groups disposed in advance of the forward end of the conveyor means.

5. A machine for field harvesting of peppers or pepper fruit comprising a mobile frame movable over a field having spaced rows of pepper plants, a picking assembly carried by the frame, the assembly comprising a structure formed to straddle a row of plants, means for repeatedly impacting both sides of the plant as the structure advances over the same, conveyor means for receiving the fruit that is removed from the plant and for conveying the same to the rear of the machine, and means disposed adjacent the advancing end of the conveyor means for picking up fruit located at or near the ground surface and for delivering the same to said conveying means, said last name means consisting of a plurality of wheels, each of the wheels being formed to provide fruit engaging fingers, and means for rotatably mounting said wheels in two laterally spaced groups, the two groups extending in advance of the forward end of the conveyor means.

* * * * *